United States Patent
Hong et al.

(10) Patent No.: US 10,736,152 B2
(45) Date of Patent: Aug. 4, 2020

(54) METHOD FOR RESOLVING RESOURCE COLLISION IN V2X COMMUNICATION ENVIRONMENT AND MOBILE DEVICE THEREFOR

(71) Applicant: LG ELECTRONICS INC., Seoul (KR)

(72) Inventors: Jongwoo Hong, Seoul (KR); Myoungseob Kim, Seoul (KR); Seungmin Lee, Seoul (KR); Youngtae Kim, Seoul (KR); Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 16/083,814

(22) PCT Filed: Mar. 13, 2017

(86) PCT No.: PCT/KR2017/002678
§ 371 (c)(1),
(2) Date: Sep. 10, 2018

(87) PCT Pub. No.: WO2017/155366
PCT Pub. Date: Sep. 14, 2017

(65) Prior Publication Data
US 2019/0075603 A1    Mar. 7, 2019

Related U.S. Application Data

(60) Provisional application No. 62/306,648, filed on Mar. 11, 2016.

(51) Int. Cl.
*H04L 12/801* (2013.01)
*H04L 12/751* (2013.01)
(Continued)

(52) U.S. Cl.
CPC ....... *H04W 74/0858* (2013.01); *H04W 4/023* (2013.01); *H04W 4/06* (2013.01);
(Continued)

(58) Field of Classification Search
CPC ... H04W 72/02; H04W 74/006; H04W 24/10; H04W 4/06; H04W 4/023; H04W 4/40;
(Continued)

(56) References Cited

U.S. PATENT DOCUMENTS

2014/0324974 A1    10/2014  Park et al.
2015/0195827 A1     7/2015  Feng et al.
(Continued)

OTHER PUBLICATIONS

3GPP TSG RAN WG1 Meeting #83 (Year: 2015).*
(Continued)

*Primary Examiner* — Brian S Roberts
*Assistant Examiner* — Abusayeed M Haque
(74) *Attorney, Agent, or Firm* — Lee, Hong, Degerman, Kang & Waimey (57) ABSTRACT

A method for resolving, by a mobile device, resource collision in a V2X communication environment may comprise the steps of: determining whether resource collision has occurred in a specific resource selected by a plurality of adjacent mobile devices; and, if it is determined that resource collision has occurred, transmitting information on the result of the determination to the plurality of adjacent mobile devices.

12 Claims, 6 Drawing Sheets

(51) Int. Cl.
*H04L 5/14* (2006.01)
*H04L 29/06* (2006.01)
*H04W 74/08* (2009.01)
*H04W 72/02* (2009.01)
*H04W 4/40* (2018.01)
*H04W 4/02* (2018.01)
*H04W 4/06* (2009.01)
*H04W 24/10* (2009.01)
*H04W 74/00* (2009.01)

(52) U.S. Cl.
CPC ............. *H04W 4/40* (2018.02); *H04W 24/10* (2013.01); *H04W 72/02* (2013.01); *H04W 74/006* (2013.01)

(58) Field of Classification Search
CPC ................. H04W 74/0858; H04W 84/005; H04W 4/046
See application file for complete search history.

(56) References Cited

U.S. PATENT DOCUMENTS

| | | | |
|---|---|---|---|
| 2016/0162783 A1* | 6/2016 | Tan | H04W 24/02 706/13 |
| 2016/0165462 A1* | 6/2016 | Tan | H04W 24/02 370/254 |
| 2016/0165469 A1* | 6/2016 | Gopalakrishnan | H04W 24/02 455/67.11 |
| 2016/0165472 A1* | 6/2016 | Gopalakrishnan | H04W 24/10 455/67.11 |
| 2016/0211980 A1* | 7/2016 | Zhu | H04W 4/06 |
| 2016/0219506 A1* | 7/2016 | Pratt | H04W 52/0209 |
| 2018/0098223 A1* | 4/2018 | Hugl | H04W 72/1268 |
| 2018/0206089 A1* | 7/2018 | Cavalcanti | H04W 4/046 |
| 2018/0270635 A1* | 9/2018 | Guo | H04W 72/0473 |

OTHER PUBLICATIONS

3GPP TSG RAN WG1 Meeting #83 (Year: 2016).*
PCT International Application No. PCT/KR2017/002678, Written Opinion of the International Searching Authority dated Jun. 8, 2017, 17 pages.
Nec, "Resource collision detection and handling", 3GPP TSG RAN WG1 Meeting #84, R1-160393, Feb. 2016, 5 pages.
Huawei, et al., "Collision avoidance for Mode 2", 3GPP TSG RAN WG1 Meeting #83, R1-156932, Nov. 2015, 7 pages.
Samsung, "Scan-based collision avoidance in V2V communication", 3GPP TSG RAN WG1 Meeting #84, R1-160573, Feb. 2016, 4 pages.

* cited by examiner

METHOD FOR RESOLVING RESOURCE COLLISION IN V2X COMMUNICATION ENVIRONMENT AND MOBILE DEVICE THEREFOR

CROSS-REFERENCE TO RELATED APPLICATIONS

This application is the National Stage filing under 35 U.S.C. 371 of International Application No. PCT/KR2017/002678, filed on Mar. 13, 2017, which claims the benefit of U.S. Provisional Application No. 62/306,648, filed on Mar. 11, 2016, the contents of which are all hereby incorporated by reference herein in their entirety.

TECHNICAL FIELD

The present invention relates to wireless communication, and more specifically, to a method for resolving resource collision in a V2X communication environment and a mobile device therefor.

BACKGROUND ART

Direction of development of intelligent transportation systems (ITS) may be divided into vehicle communication technology and intelligent vehicle technology. Technologies for providing various services such as provision of real-time traffic information, warning for vehicle safety enhancement, messages for achieving smooth traffic flow and coordinated driving using vehicle communication have taken a major step forward according to development of vehicle communication. While development of intelligent vehicles improves convenience of a human-machine interface (HMI), vehicles equipped with various intelligent systems capable of reducing driver fatigue and aiding in safe driving appear owing to development of advanced driver assistance systems.

Vehicle-to-everything (V2X) refers to all types of communication methods applicable to roads and vehicles and represents a specific communication technology for realizing "connected vehicles" or "networked vehicles". V2X networking is classified into three categories, that is, vehicle-to-infrastructure (V2I) communication, vehicle-to-vehicle (V2V) communication, and vehicle-to-pedestrian (V2P) communication. Vehicle-to-grid (V2G) which has recently emerged is expected to be added as another communication category in association with charging of electric vehicles.

DISCLOSURE

Technical Problem

An object of the present invention is to provide a method for resolving resource collision by a mobile device in a V2X communication environment.

Another object of the present invention is to provide a mobile device for resolving resource collision in a V2X communication environment.

Technical tasks obtainable from the present invention are non-limited the above-mentioned technical task. Additionally, other unmentioned technical tasks can be clearly understood from the following description by those having ordinary skill in the technical field to which the present invention pertains.

Technical Solution

To accomplish the aforementioned object, a method for resolving, by a mobile device, a resource collision in a V2X communication environment may include determining whether resource collision has occurred in a specific resource selected by a plurality of neighbor mobile devices; and when it is determined that the resource collision has occurred, transmitting information on the result of the determination to the plurality of neighbor mobile devices.

The determining may include determining that the resource collision has occurred when a reference signals received power (RSRP) value in the specific resource is higher than a predefined first threshold value but a signal-to-interference-plus-noise ratio (SINR) value is lower than a predefined second threshold value.

The method may further include estimating the SINR value based on of the RSRP value and a received signal strength indicator (RSSI) value in the specific resource. The information on the result of the determination may include at least one of information indicating the specific resource or identifier information on the plurality of mobile devices. The selected specific resource is randomly selected by the plurality of neighbor mobile devices. The mobile device and the plurality of neighbor mobile devices may belong to the same group based on geographical information.

The method may further include transmitting scheduling assignment (SA) or data in a resource corresponding to time different from the specific resource in the time domain.

To accomplish the other object, a mobile device for resolving a resource collision in a V2X communication environment may include: a processor configured to determine whether the resource collision has occurred in a specific resource selected by a plurality of neighbor mobile devices; and a transmitter configured to, when it is determined the resource collision has occurred, transmit information on a result of the determining to the plurality of neighbor mobile devices. The processor may be configured to determine that the resource collision has occurred when a reference signals received power (RSRP) value in the specific resource is higher than a predefined first threshold value but a signal-to-interference-plus-noise ratio (SINR) value is lower than a predefined second threshold value. The processor may be configured to estimate the SINR value based on the RSRP value and a received signal strength indicator (RSSI) value in the specific resource. The information on the result of the determining may include at least one of information indicating the specific resource or identifier information on the plurality of mobile devices. The selected specific resource is randomly selected by the plurality of neighbor mobile devices. The mobile device and the plurality of neighbor mobile devices may belong to the same group based on the geographical information.

The mobile device may further include a transmitter configured to transmit scheduling assignment (SA) or data in a resource corresponding to time different from the specific resource in the time domain.

Advantageous Effects

According to an embodiment of the present invention, it is possible to effectively resolve resource collision when semi-persistent scheduling (SPS) of selected resources is performed in V2V communication.

Effects obtainable from the present invention may be non-limited by the above mentioned effect. In addition, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 1:
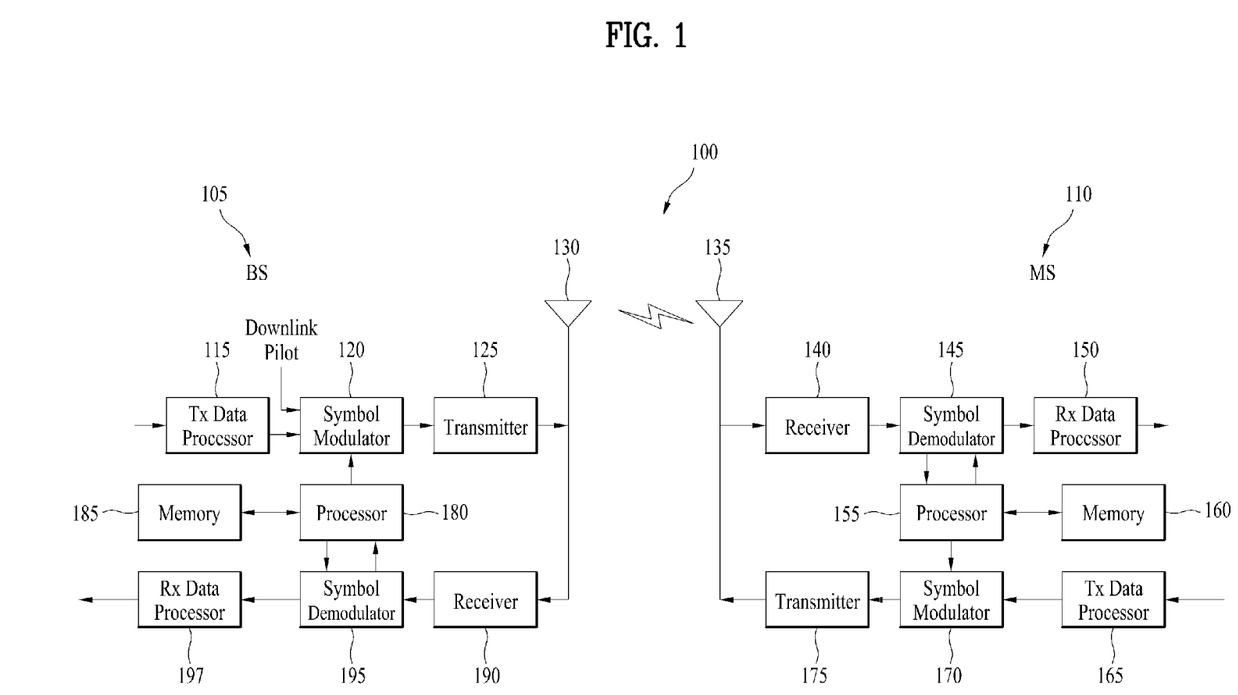
FIG. 1 is a block diagram showing configurations of a base station 105 and a UE 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention considers a scenario or a mode in which mobile devices (referred to as vehicles as an example hereinafter) select resources for transmission in a distributed manner in V2X communication. That is, a mode in which a vehicle selects resources for SA and data transmission in V2X communication is considered.

Resources selected in V2V communication among V2X communication methods operate according to SPS. To this end, vehicles are allocated resources by infrastructure (e.g., a base station) or randomly select resources. In the case of allocation of resources from infrastructure, resource collision does not occur because the infrastructure allocates different resources to vehicles but resources need to be allocated to all vehicles and thus additional signaling is required. On the other hand, in the case of a method by which vehicles randomly select resources in a distributed manner, additional signaling for resource selection is not required. However, if vehicles simultaneously select the same resource, resource collision occurs. When such resource collision occurs, vehicles which have selected colliding resources cannot detect resource collision and interference occurs between vehicles using the same resources before the vehicles reselect resources. If vehicles transmit data using colliding resources, data reception performance of neighbor vehicles may deteriorate due to interference between vehicles.

To solve such problems, the present invention proposes a method of notifying occurrence of resource collision by detecting neighbor vehicles and piggybacking resource collision occurrence in a specific resource on data periodically transmitted by the neighbor vehicles. A message periodically transmitted in V2X is used as a method for notification of such resource collision occurrence, and thus additional resources for notification of collision occurrence are not needed. In addition, the present invention proposes a method of resolving resource collision through infrastructure (e.g., a base station) instead of vehicles.

Figure 2:
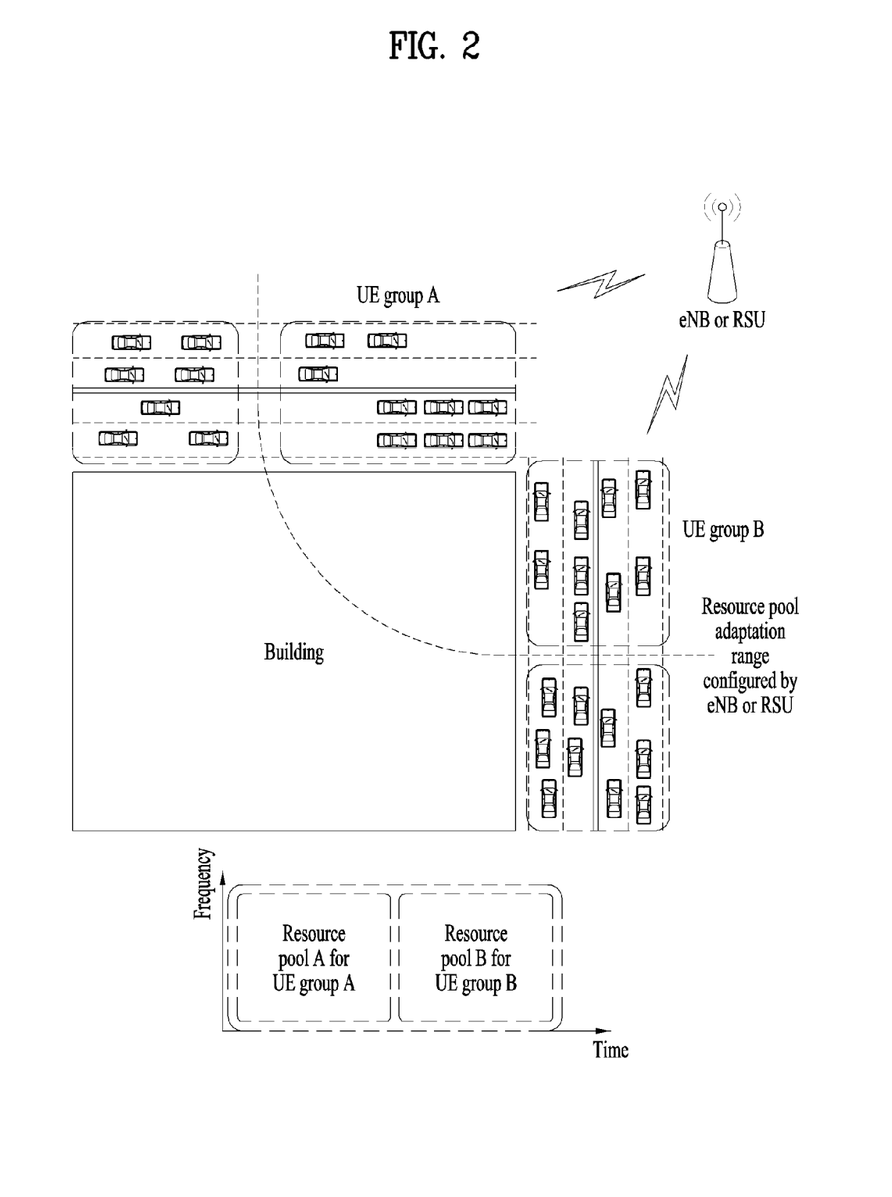
FIG. 2 illustrates an example of resource pool allocation in V2V communication.

FIG. 2 illustrates an example of resource pool allocation in V2V communication.

In a V2V environment, vehicles may be grouped into a plurality of groups based on proximity in distance (or time). As shown in FIG. 2, vehicles close in distance may be grouped into a plurality of groups such as UE group A and UE group B. A base station or a road side unit (RSU) may group vehicles within a resource pool adaptation range set thereby. The base station or the RSU may partition and configure resource pools per group. Referring to FIG. 2, the base station or the RSU may discriminate UE group A from UE group B in the time domain and allocate resources pools thereto, for example.

Figure 3:
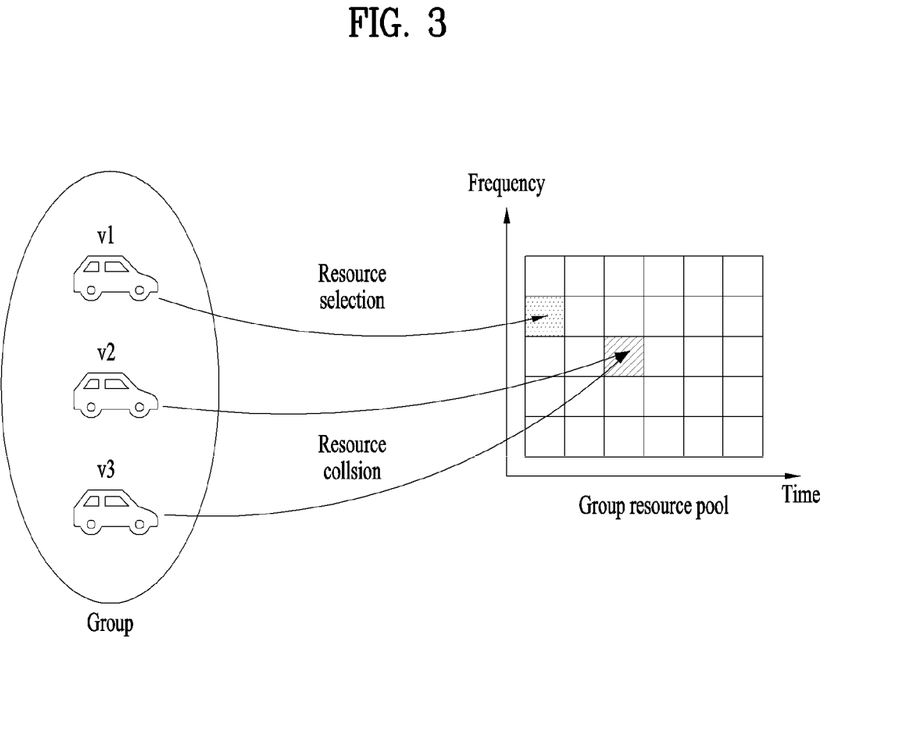
FIG. 3 illustrates an example of occurrence of resource collision between vehicles in a group.

FIG. 3 illustrates an example of occurrence of resource collision between vehicles in a group.

FIG. 3 shows an example of resource collision occurring when a plurality of vehicles selects the same resource in resources allocated per group. As shown in FIG. 3, resource collision occurs when vehicle 2 v2 and vehicle 3 v3 in a group simultaneously randomly select the same resource (e.g., SA resource or resource for data transmission) in a distributed manner. Furthermore, as the density of vehicles in a group increases in an urban environment, resource collision may occur more frequently. However, methods for solving resource collision problem of vehicles in V2V communication have not been proposed. As shown in FIG. 3, when vehicle 2 v2 and vehicle 3 v3 select the same resource and then transmit SA and data in the selected resource, they do not know whether resource collision occurs in the resource. Here, a minimum unit of resources for SA and data transmission is a resource block (RB).

As described above, when resource collision occurs, vehicles that have selected the colliding resource cannot be aware of the resource collision. In this case, neighbor vehicles in the same group may notify the vehicles of the resource collision. As shown in FIG. 3, vehicle 1 v1 neighbor to vehicle 2 v2 and vehicle 3 v3 may notify vehicle 2 v2 and vehicle 3 v3 of occurrence of resource collision in the resource selected by the vehicle 2 v2 and vehicle 3 v3. Here, neighbor vehicle 1 v1 needs to be a vehicle which has selected a resource different from the resource in which the resource collision occurs in the time domain.

Figure 4:
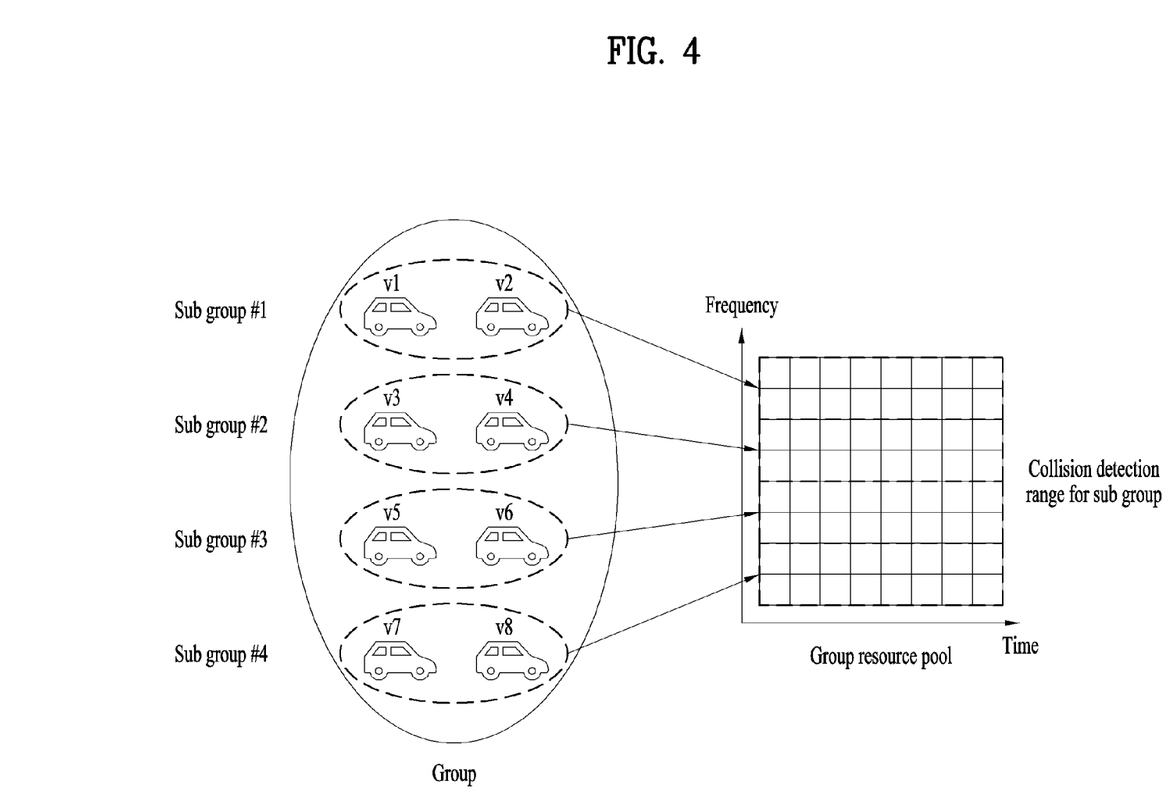
FIG. 4 illustrates sub-group allocation for resource collision detection.

FIG. 4 illustrates sub-group allocation for resource collision detection.

As shown in FIG. 4, vehicles in a group may be divided into four sub-groups, and vehicles in a sub-group may perform resource collision detection in a resource range allocated to the sub-group as resource collision detection range. Infrastructure (e.g., a base station) may configure sub-groups in advance based on the vehicle IDs (e.g., UE IDs).

As shown in FIG. 4, vehicle 1 v1 and vehicle 2 v2 may detect resource collision only in a resource range corresponding to sub-group #1 (e.g., a region represented as a range having the highest frequency band in the time-frequency domain in FIG. 4). A resource range for collision detection is limited per group in order to reduce overhead of vehicles for collection detection. Although FIG. 4 shows that vehicle 1 v1 and vehicle 2 v2 detect resource collision only in the region represented as a range having the highest frequency band in the time-frequency domain, vehicle 1 v1 and vehicle 2 v2 may perform transmission and reception through SA and data resources as in conventional methods.

For resource collision detection, vehicles of all groups receive all SA or data messages in SA or data pools (e.g., a control channel of a link of the vehicles). A collision in a specific resource range may be detected in a procedure of receiving such SA or data messages. When a vehicle has received a reference signal of SA or data in a specific resource, a vehicle which transmits a message using SA or data resources may be assumed to be located in proximity to the vehicle if an RSRP (in dBm) in the specific resource is very high. In addition, the vehicle may recognize that a vehicle generating interference is located in proximity thereto or that resource collision has occurred due to selection of the same resource by multiple vehicles when an RSSI signal of an SA or data message received in the specific resource is high. When a collision has occurred, the sum of interferences increases and thus an energy signal level may increase. When an RSRP signal is excluded from such an energy level value, an interference signal remains and the vehicle may estimate an SINR value (in dB) in the specific resource through the interference signal and RSPR signal strength.

Consequently, the neighbor vehicle may estimate an RSRP value in the specific resource and estimate an SINR value in the specific resource using the estimated RSRP and RSSI values. That is, signal strength is obtained based on the RSRP value and the strength of the interference signal is obtained based on an RSSI (Received Signal Strength Indicator) in the specific resource. The neighbor vehicle may determine the signal strength based on the RSRP value in the specific resource and recognize the sum of the signal and interference through the RSSI value in the specific resource. When the RSRP based signal strength is excluded from the RSSI value, interference signal strength of the specific resource can be detected. Accordingly, signal strength and interference strength can be detected and an SINR by which resource collision can be recognized can be estimated. If the estimated RSRP is higher than a predefined threshold value but the estimated SINR value is lower than a predefined threshold value, the neighbor vehicle may determine that resource collision between vehicles has occurred in the specific resource.

In addition, when neighbor vehicles are allocated to a sub-group based on geographical information of vehicles, a vehicle may estimate a distance to an neighbor vehicle and transmission power of the neighbor vehicle. If the vehicle receives consecutive SA and data in a specific resource, when an energy level is higher than a predefined threshold value based on RSRP, the vehicle may determine that the energy level has increased due to interference caused by transmission of multiple vehicles. Information on vehicles which transmit such resources may be identified with a source ID or an SA resource index included in an SA message and transmitted in the case of SA and with a data resource index in the case of data.

Based on such collision occurrence determination, the vehicle piggybacks information indicating a colliding vehicle (e.g., SA or data resource index or source ID information) on data to be periodically transmitted to transmit the information when resource collision has occurred. Vehicles which have received the aforementioned resource collision information may determine that the resources selected thereby have collided based on the piggybacked and transmitted resource index or source ID information and re-select resources to resolve the resource collision.

Furthermore, vehicles transmit a reservation message in a resource to be selected in order to avoid collision with other vehicles for SPS transmission. The aforementioned resource collision information may be transmitted through the reservation message.

Meanwhile, a method of allocating a dedicated resource may be considered for collision notification. For example, if resources for notification are pre-configured through mapping using a hash function based on a source ID or resource pool, collision notification may be transmitted through mapped resources when a collision occurs.

Further, a method of sequentially performing notification of resource collision information with respect to multiple resources in consideration of an interface level when the multiple resources have collided simultaneously in a collection detection section or range may be considered, as shown in FIG. 4. When multiple vehicles receive resource collision notification information, a method of sequentially changing resources by sub-groups including the vehicles instead of simultaneously changing resources by the vehicles may be considered.

Methods of resolving resource collision by vehicles when resource collision has occurred have been described as a method for avoiding resource collision. As a method different from the above-described methods, a method of efficiently resolving collision using infrastructure (e.g., a base station) may be considered in a V2X environment.

Figure 5:
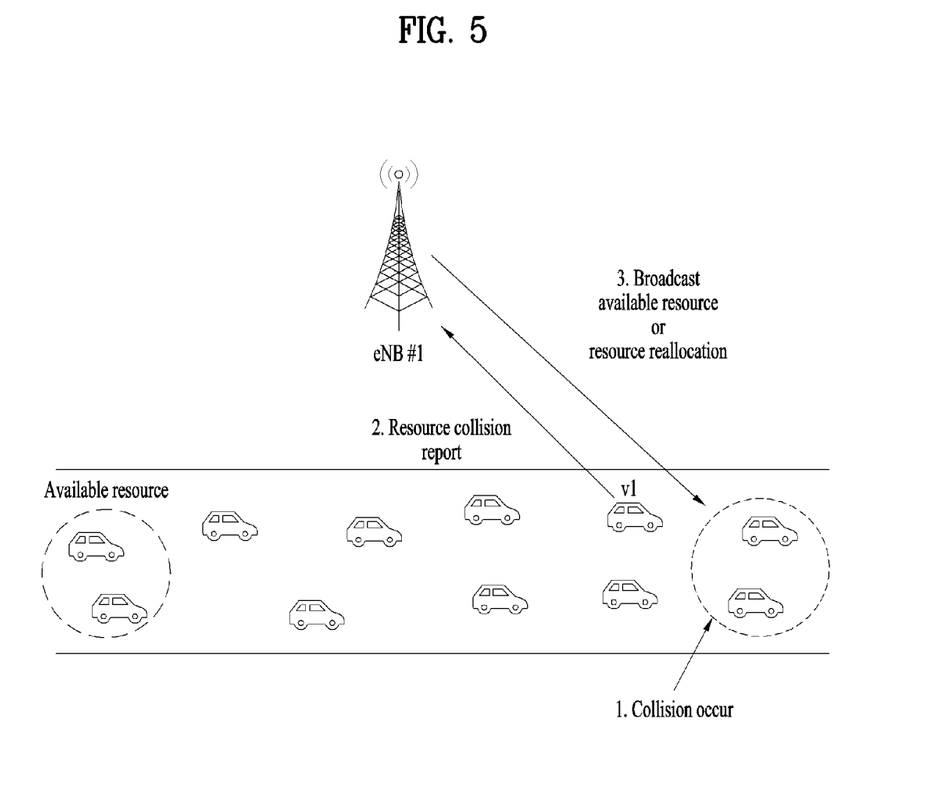
FIG. 5 is a diagram for describing a method of resolving resource collision through infrastructure (e.g., a base station).

FIG. 5 is a diagram for describing a method of resolving resource collision through infrastructure (e.g., a base station).

FIG. 5 shows a method of resolving collision by a base station. When an neighbor vehicle (v1 in FIG. 5) detects resource collision, the base station (eNB #1 in FIG. 5) may transmit information (e.g., resource indexes) indicating colliding resources or vehicle IDs of vehicles having the resource collision. The base station may resolve the resource collision through collision notification. The base station knows locations and movement directions of vehicles and may reselect resources having low energy levels, that is, resources distant from resources of the vehicles having the resource collision, based on information such as the locations and movement directions of the vehicles and transmit resource reallocation information to the vehicles having the resource collision. Alternatively, the base station may broadcast available resources to the vehicles having the resource collision and the vehicle having the resource collision may reselect resources from the available resources to avoid resource collision. When a large amount of resources simultaneously collides, the base station may transmit information about available resources or resource reallocation information to a large number of vehicles to solve resource collision problem of the vehicles.

Figure 6:
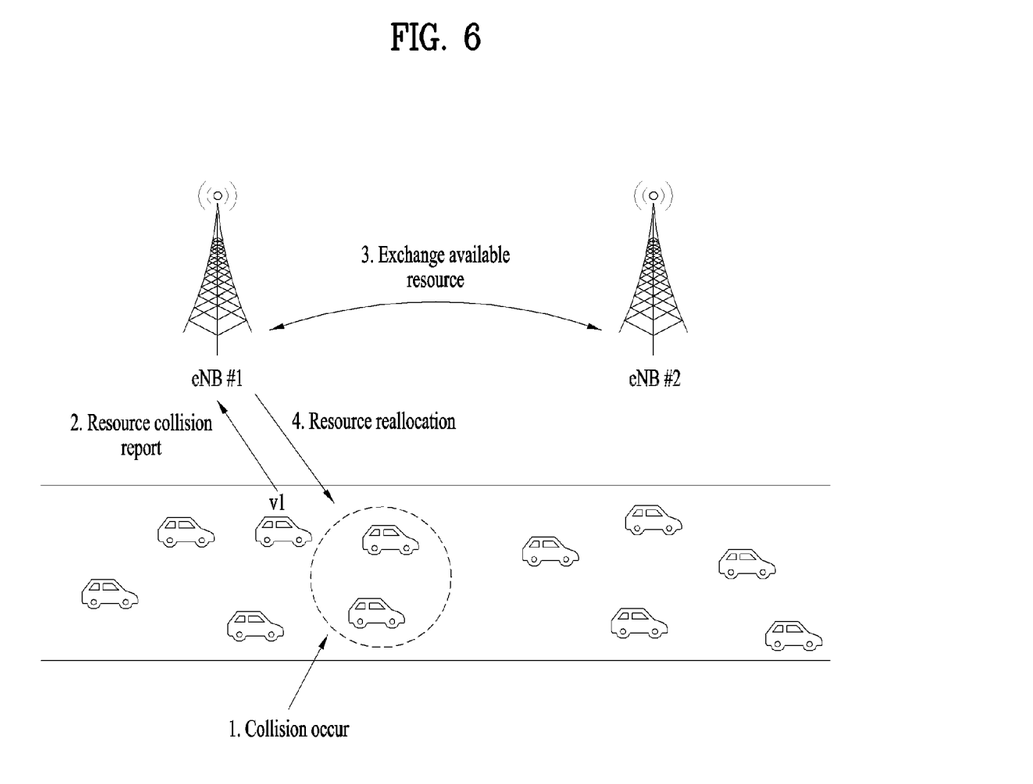
FIG. 6 is a diagram for describing a method of resolving resource collision using an neighbor base station (e.g., a base station).

FIG. 6 is a diagram for describing a method of resolving resource collision using an neighbor base station.

Specifically, FIG. 6 is a diagram for describing a method of resolving collision through neighbor base stations instead of one base station when resource collision occurs. Since a high mobility environment is also considered in the current V2V scenario, a vehicle may perform transmission according to SP in a selected resource and then move to an neighbor cell, causing occurrence of collision in such a case. To solve a problem in this case, base station 1 (eNB #1 in FIG. 6) may receive information on available resources (i.e., collision-free resources) from base station 2 (eNB #2 in FIG. 6) located in a direction in which vehicles having colliding resources intend to move through an X2 interface in consideration of directions of the vehicles using colliding resources (or vehicles having colliding resources) upon reception of collision notification information from a specific vehicle (e.g., v1). Base station 1 may transmit the received information on available resources or information (i.e., resource reselection information) on resources reselected based on the received information on available resources to the vehicles using colliding resources.

When the method described with reference to FIG. 6 is used, even if the vehicles using colliding resources moves to a neighbor cell (cell to which eNB #2 belongs in FIG. 6), the vehicles using colliding resources may perform transmission through the reselected resources received from base station 1 to resolve occurrence of collision.

The above-described embodiments correspond to combinations of elements and features of the present invention in prescribed forms. In addition, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for resolving resource collision in a V2X communication environment and the mobile device therefor are industrially applicable to various wireless communication systems such as 3GPP LTE-A, 5G and IoT.

What is claimed is:
1. A method for resolving, by a mobile device, a resource collision in a Vehicle-to-everything (V2X) communication environment, the method comprising:
   determining whether the resource collision has occurred in a specific resource selected by a plurality of neighbor mobile devices; and
   when it is determined the resource collision has occurred, transmitting information on a result of the determining to the plurality of neighbor mobile devices,
   wherein the determining comprises determining that the resource collision has occurred when a reference signals received power (RSRP) value in the specific resource is higher than a predefined first threshold value but a signal-to-interference-plus-noise ratio (SINR) value is lower than a predefined second threshold value.

2. The method according to claim 1, further comprising: estimating the SINR value based on the RSRP value and a received signal strength indicator (RSSI) value in the specific resource.

3. The method according to claim 1, wherein the information on the result of the determining includes at least one of information indicating the specific resource or identifier information on the plurality of neighbor mobile devices.

4. The method according to claim 1, wherein the selected specific resource is randomly selected by the plurality of neighbor mobile devices.

5. The method according to claim 1, wherein the mobile device and the plurality of neighbor mobile devices belong to a same group based on geographical information.

6. The method according to claim 1, further comprising:
transmitting scheduling assignment (SA) or data in a resource corresponding to a time different from the specific resource in a time domain.

7. A mobile device for resolving a resource collision in a Vehicle-to-everything (V2X) communication environment, the mobile device comprising:
a processor configured to determine whether the resource collision has occurred in a specific resource selected by a plurality of neighbor mobile devices; and
a transmitter configured to, when it is determined that the resource collision has occurred, transmit information on a result of the determining to the plurality of neighbor mobile devices,
wherein the processor is further configured to determine that the resource collision has occurred when a reference signals received power (RSRP) value in the specific resource is higher than a predefined first threshold value but a signal-to-interference-plus-noise ratio (SINR) value is lower than a predefined second threshold value.

8. The mobile device according to claim 7, wherein the processor is further configured to estimate the SINR value based on the RSRP value and a received signal strength indicator (RSSI) value in the specific resource.

9. The mobile device according to claim 7, wherein the information on the result of the determining includes at least one of information indicating the specific resource or identifier information on the plurality of neighbor mobile devices.

10. The mobile device according to claim 7, wherein the selected specific resource is randomly selected by the plurality of neighbor mobile devices.

11. The mobile device according to claim 7, wherein the mobile device and the plurality of neighbor mobile devices belong to a same group based on geographical information.

12. The mobile device according to claim 7, wherein the transmitter is further configured to transmit scheduling assignment (SA) or data in a resource corresponding to a time different from the specific resource in a time domain.

* * * * *